(12) United States Patent
Okamoto et al.

(10) Patent No.: US 9,564,661 B2
(45) Date of Patent: Feb. 7, 2017

(54) BATTERY MODULE AND WIRING MODULE

(71) Applicants: AUTONETWORKS TECHNOLOGIES, LTD, Yokkaichi, Mie (JP); SUMITOMO ELECTRIC INDUSTRIES, LTD., Yokkaichi, Mie (JP); SUMITOMO WIRING SYSTEMS, LTD., Osaka-shi, Osaka (JP)

(72) Inventors: Ryoya Okamoto, Yokkaichi (JP); Hiroomi Hiramitsu, Yokkaichi (JP); Hiroki Hirai, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 434 days.

(21) Appl. No.: 14/350,667

(22) PCT Filed: Oct. 11, 2012

(86) PCT No.: PCT/JP2012/076294
§ 371 (c)(1),
(2) Date: Apr. 9, 2014

(87) PCT Pub. No.: WO2013/061787
PCT Pub. Date: May 2, 2013

(65) Prior Publication Data
US 2014/0295225 A1    Oct. 2, 2014

(30) Foreign Application Priority Data
Oct. 25, 2011 (JP) .................. 2011-233811

(51) Int. Cl.
H01M 2/00 (2006.01)
H01M 10/42 (2006.01)
(Continued)

(52) U.S. Cl.
CPC ........... *H01M 10/425* (2013.01); *H01M 2/206* (2013.01); *H01M 2/305* (2013.01);
(Continued)

(58) Field of Classification Search
CPC .... H01M 2/206; H01M 2/305; H01M 10/425; H01M 10/482; H01M 2220/20; H01R 11/11
See application file for complete search history.

(56) References Cited

U.S. PATENT DOCUMENTS

2002/0102457 A1  8/2002  Oogami et al.
2012/0171908 A1  7/2012  Henmi

FOREIGN PATENT DOCUMENTS

JP   A-2001-266825   9/2001
JP   A-2006-324348   11/2006
(Continued)

OTHER PUBLICATIONS

International Search Report issued in International Patent Application No. PCT/JP2012/076294 dated Dec. 18, 2012.
(Continued)

*Primary Examiner* — Raymond Alejandro
(74) *Attorney, Agent, or Firm* — Oliff PLC

(57) ABSTRACT

There are provided an electric cell group of a plurality of electric cells 11 with positive and negative electrode terminals, connecting members for connecting adjacent electrode terminals, and a wiring module assembled to the electric cell group. The wiring module includes a plurality of voltage detection terminals connected to the ends of a plurality of electric wires W for detecting the conditions of the electric (Continued)

cells, a plurality of retainer portions retaining the detection terminals, and interval adjusting device provided between a plurality of adjacent retainer portions for adjusting the intervals between the retainer portions.

10 Claims, 10 Drawing Sheets

(51) Int. Cl.
    *H01M 2/20*     (2006.01)
    *H01M 2/30*     (2006.01)
    *H01M 10/48*     (2006.01)
    *H01R 11/11*     (2006.01)

(52) U.S. Cl.
    CPC ........... *H01M 10/482* (2013.01); *H01R 11/11* (2013.01); *H01M 2220/20* (2013.01)

(56) References Cited

FOREIGN PATENT DOCUMENTS

| | | | | |
|---|---|---|---|---|
| JP | 2009-059663 A | 3/2009 | | |
| JP | A-2009-266614 | 11/2009 | | |
| JP | A-2010-170884 | 8/2010 | | |
| JP | 2011-070846 | * 4/2011 | ............. | H01M 2/20 |
| JP | A-2011-070846 | 4/2011 | | |
| JP | A-2011-175928 | 9/2011 | | |

OTHER PUBLICATIONS

Feb. 11, 2015 Search Report issued in Japanese Application No. 12844388.4.

* cited by examiner

BATTERY MODULE AND WIRING MODULE

This application is a U.S. national stage application of International Application PCT/JP2012/076294, filed Oct. 11, 2012, which claims priority to Japan Patent Application No. 2011-233811, filed Oct. 25, 2011, the disclosures of which are incorporated by reference herein in their entirety.

TECHNICAL FIELD

The present invention relates to battery modules and wiring modules.

BACKGROUND ART

In a battery module for electric cars or hybrid cars, a plurality of electric cells having positive and negative electrode terminals are arranged in a row. The electrode terminals of electric cells that are adjacent to each other are connected by a connecting member (bus bar) to connect the plurality of electric cells in series or parallel.

In Patent Document 1, identified below, connecting members that connect electrode terminals and voltage detection terminals placed on the connecting members are contained in a plurality of basic units made of a synthetic resin. A battery connection assembly (wiring module) is fabricated by connecting the adjacent basic units. The electric wires connected to the voltage detection terminals of the battery connection assembly (wiring module) extend through a trough to a battery ECU, where the voltages of the electric cells are detected.

CITATION LIST

Patent Documents

Patent Document 1: JP 2011-175928A

SUMMARY OF INVENTION

Technical Problem

According to Patent Document 1, each voltage detection terminal is placed on the area of the connecting member in line with the electrode terminals. There may be cases where it is desired that the voltage detection terminal be disposed in an area other than that in line with the electrode terminals. For example, it may be desired that the voltage detection terminal be connected to an electrode for voltage detection provided in a position different from the electrode terminals connected by the connecting member in the electric cell, or the voltage detection terminal be repositioned to simplify the routing of the electric wire connected to the voltage detection terminal.

If, as in these cases, the voltage detection terminal is placed on an area of the connecting member other than that in line with the electrode terminals in the wiring module, a space for accommodating only the voltage detection terminal needs to be provided in the wiring module in addition to the space for the connecting member, which hinders the miniaturization of the wiring module.

The present invention has been completed in the light of the above-described circumstances and its object is to miniaturize a wiring module.

Solution to Problem

A battery module according to the present invention a preferred embodiment is characterized by comprising: an electric cell group of a plurality of electric cells with positive and negative electrode terminals; connecting members that connect adjacent ones of the electrode terminals; and a wiring module assembled to the electric cell group; wherein the wiring module comprises a plurality of detection terminals connected to ends of a plurality of electric wires for detecting conditions of electric cells, a plurality of retainer portions retaining the detection terminals; and an interval adjusting device provided between adjacent ones of the plurality of retainer portions for adjusting the intervals between the retainer portions.

According to this structure, as the connecting members are formed separately from the wiring module, the wiring module can be made smaller.

As for the dimensional tolerance between adjacent electric cells, the interval adjusting device, provided between the adjacent retainer portions, can prevent discrepancies caused by the dimensional tolerance between the adjacent electric cells.

Preferably, embodiments of the foregoing structure have the structures below.

The connecting members include an electrode connecting portion that connects the adjacent ones of the electrode terminals and a detection connecting portion placed on and connected to one of the detection terminals.

In this way, even if the connecting members are provided separately from the wiring module, it is possible to detect from the detection terminals the conditions between the electrode terminals with a simple structure.

The interval adjusting device includes flexible portions extending obliquely with respect to the direction in which the retainer portions are aligned so as to be elastically deformable in the direction in which the retainer portions are aligned.

This simple structure can accommodate the dimensional tolerance between the electric cells.

The flexible portions are thick-walled in the direction in which the wiring module is assembled to the electric cells group.

This may increase the rigidity of the wiring module in the direction of its assembly.

The electric cell group has the electrode terminals arranged in two rows and the wiring module includes a resin protector having the plurality of retainer portions and the interval adjusting device, wherein the resin protector includes a first protector and a second protector assembled to the respective rows of the electrode terminals, wherein the first protector and the second protector are both provided with troughs through which the electric wires connected to the detection terminals are routed, and wherein the troughs of the first protector and the second protector are alternately aligned with one another to form a single wire accommodation trough.

This allows the electric wires to be routed through the single wire accommodation trough, thereby simplifying the structure for routing of the electric wires.

A wiring module according to a preferred embodiment is a wiring module characterized by being capable of being assembled to an electric cell group of a plurality of electric cells with positive and negative electrode terminals, adjacent ones of the electrode terminals being connected to one another with connecting members, the wiring module comprising: a plurality of detection terminals connected to ends of a plurality of electric wires for detecting conditions of electric cells; a plurality of retainer portions retaining the detection terminals; and an interval adjusting device provided between adjacent ones of the plurality of retainer portions for adjusting the intervals between the retainer portions.

According to this structure, as the connecting members are formed separately from the wiring module, the wiring module can be made smaller.

As for the dimensional tolerance between adjacent electric cells, the interval adjusting device, provided between the adjacent retainer portions, can prevent discrepancies caused by the dimensional tolerance between the adjacent electric cells.

Preferably, embodiments of the foregoing structure have the structures below.

The connecting members include an electrode connecting portion that connects the adjacent ones of the electrode terminals and a detection connecting portion placed on and connected to one of the detection terminals.

In this way, even if the connecting members are provided separately from the wiring module, it is possible to detect from the detection terminals the conditions between the electrode terminals with a simple structure.

The interval adjusting device includes flexible portions extending obliquely with respect to the direction in which the retainer portions are aligned so as to be elastically deformable in the direction in which the retainer portions are aligned.

This simple structure can accommodate the dimensional tolerance between the electric cells.

The flexible portions are thick-walled in the direction in which the wiring module is assembled to the electric cells group.

This may increase the rigidity of the wiring module in the direction of its assembly.

The electric cell group has the electrode terminals arranged in two rows and the wiring module includes a resin protector having the plurality of retainer portions and the interval adjusting device, wherein the resin protector includes a first protector and a second protector assembled to the respective rows of the electrode terminals, wherein the first protector and the second protector are both provided with troughs through which the electric wires connected to the detection terminals are routed, and wherein the troughs of the first protector and the second protector are alternately aligned with one another to form a single wire accommodation trough.

This allows the electric wires to be routed through the single wire accommodation trough, thereby simplifying the structure for routing of the electric wires.

Advantageous Effects of Invention

The present invention makes it possible to make a wiring module more compact.

DESCRIPTION OF EMBODIMENTS

Embodiments

One embodiment of the present invention will be described with reference to FIGS. 1-12.

Figure 1:
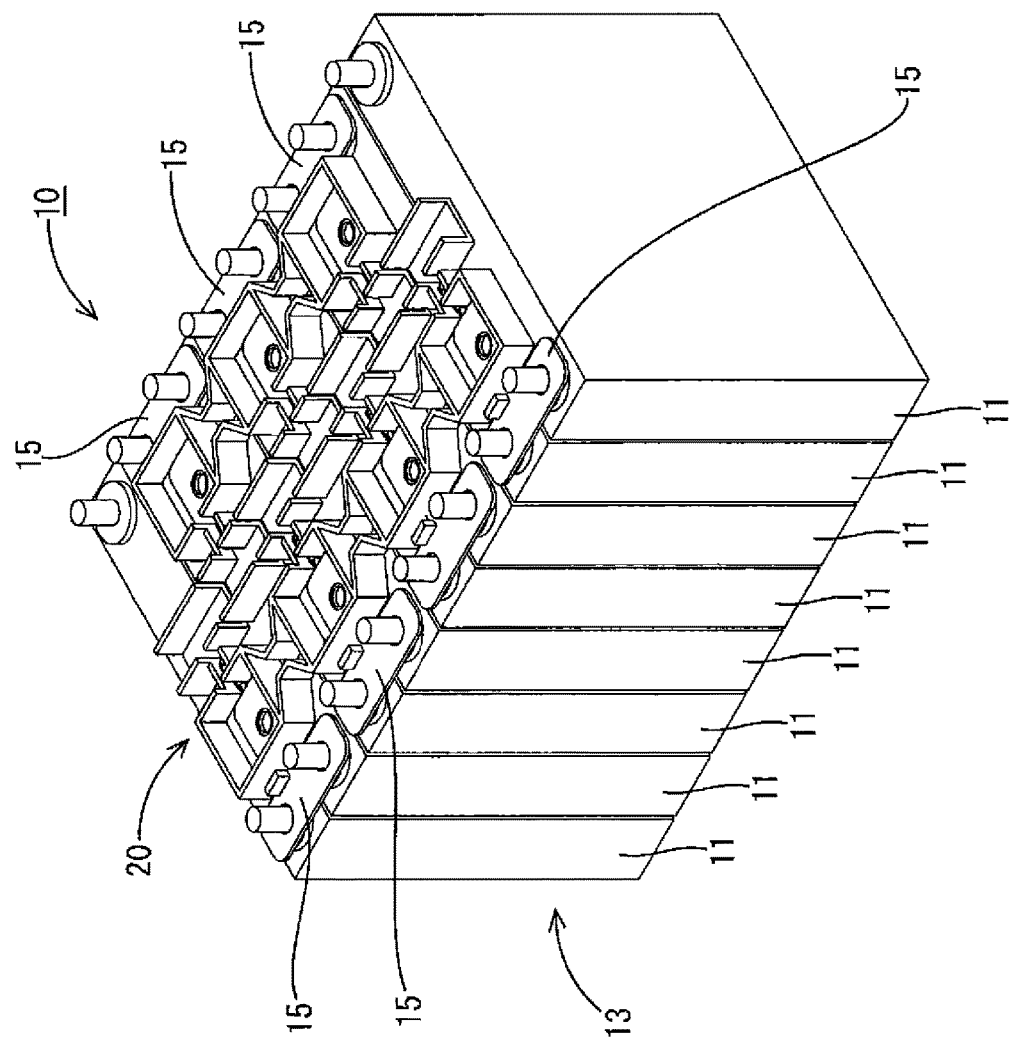
FIG. 1 is a perspective view showing a battery module according to an embodiment of the present invention.

As shown in FIG. 1, a battery module 10 of the present embodiment is assembled by mounting a wiring module 20 on an electric cell group 13 of a plurality of electric cells 11 arranged in rows. This battery module 10 is used, for example, as a power source for electric cars or hybrid cars. The vertical direction as referred to hereafter is based on the view in FIG. 3, the forward direction refers to the direction towards the bottom of FIG. 2 and the rear direction refers to the direction towards the top of FIG. 2.

Battery Module

Figure 2:
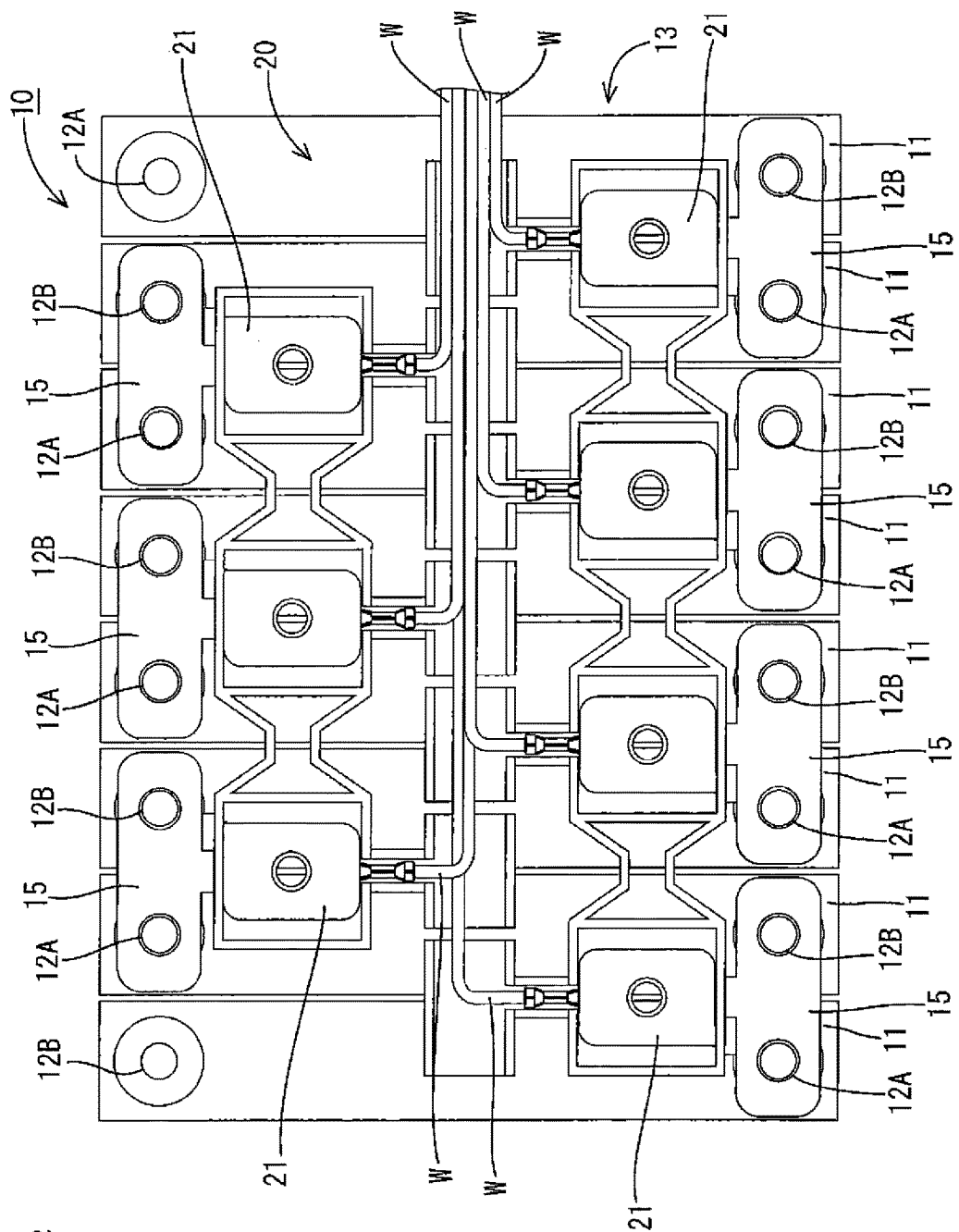
FIG. 2 is a plan view showing the battery module.
Figure 3:
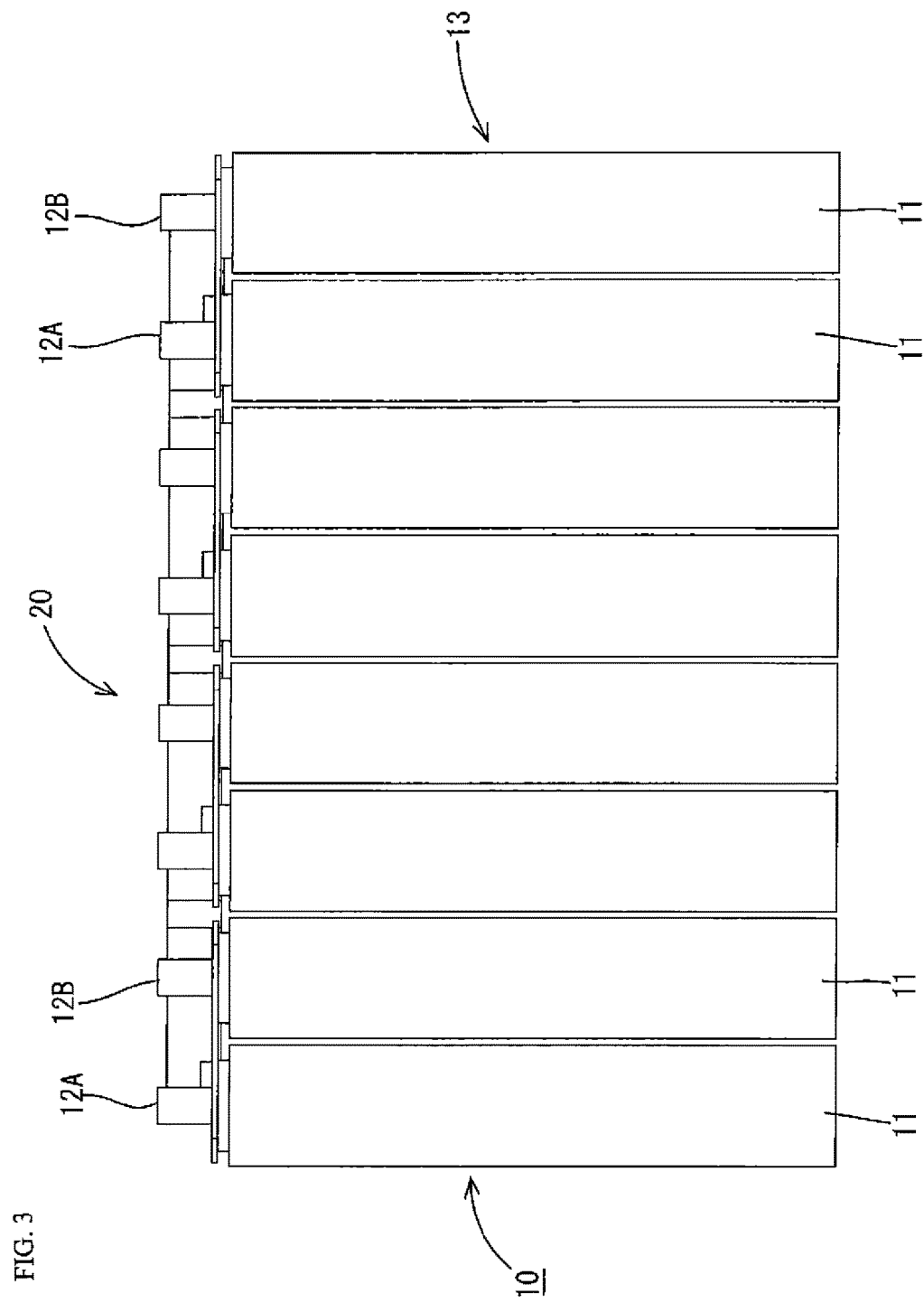
FIG. 3 is an elevation view of the battery module.

As shown in FIG. 2, the battery module 10 comprises an electric cell group 13 of a plurality of electric cells 11 arranged side by side, connecting members 15 that connect adjacent electrode terminals 12A and 12B, and a wiring module 20 assembled to the top surface of the electric cell group 13.

Each electric cell 11 includes a pair of electrode terminals 12A and 12B vertically protruding from the upper surface of a main body having the shape of a rectangular solid that contains a power generation element (not shown).

The electrode terminals 12A and 12B (12A is shown as the positive electrode and 12B as the negative electrode) are bolts provided in the front and rear portions of the main body and have external thread grooves on their outer circumference.

The polarities (positive and negative) of adjacent electric cells 11 are arranged such that electrode terminals 12A and 12B of opposite polarity are arranged adjacent to one another. The plurality of electric cells 11 are secured by retainer plates (not shown).

In the electric cell group 13 thus constructed, electrode terminals 12A and 12B are arranged in two rows, a front and a rear row, such that the plurality of electric cells 11 is connected in series by assembling the connecting members 15 to the electric cells 11.

Connecting Members

Figure 4:
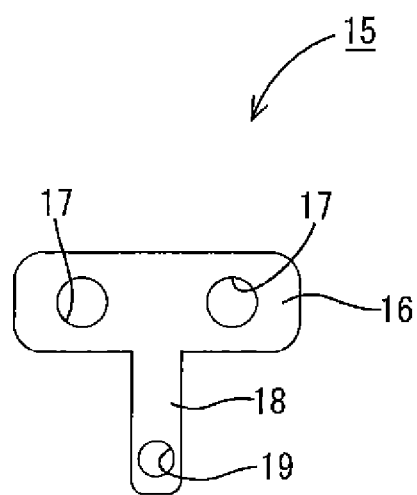
FIG. 4 is a plan view showing a connecting member.

The connecting members 15 are made of a metal plate, such as copper, copper alloy, aluminum, etc. As shown in FIG. 4, each connecting member 15 has a T-shape with an electrode connecting portion 16 laterally extending to connect adjacent electrode terminals 12A and 12B and a detection connecting portion 18 extending forward to be connected to a voltage detection terminal 21.

A pair of left and right through-holes 17 is formed in the electrode connecting portion 16. The through-holes 17 have an elliptical shape slightly elongated in the lateral direction.

The detection connecting portion 18 extends in the forward direction from the laterally intermediate part (the lateral direction is the direction of the elongation of the electrode connecting portion 16 and the forward direction is perpendicular to the direction of elongation) and has a smaller width than the electrode connecting portion 16.

Formed at the front end portion of the detection connecting portion 18 is a terminal fixing hole 19 that has a circular shape. The terminal fixing hole 19 is provided for securing the connecting member 15 to the voltage detection terminal 21 with a fixing member (not shown).

Note that the securing with the fixing member may be achieved, for example, by burring the terminal fixing hole 19 and cutting a thread groove in the inner surface thereof or welding a nut to the rear surface of the detection connecting portion 18 so as to align the threaded hole of the nut with the terminal fixing hole 19. This provides a threaded groove aligned with the inner surface of the terminal fixing hole 19 to allow a fixing member, such as a bolt, to be used for fastening.

Wiring Module

Figure 5:
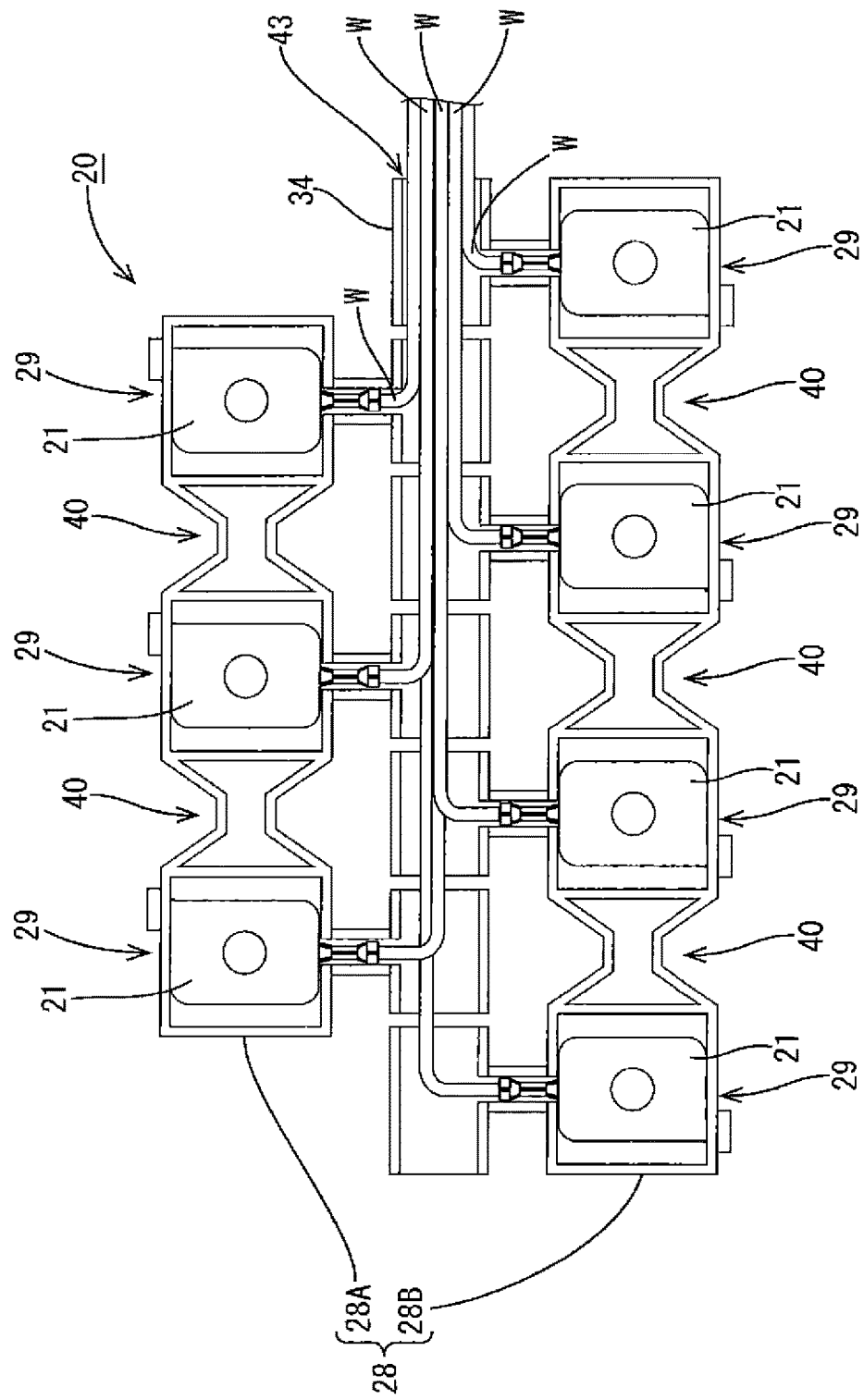
FIG. 5 is a plan view showing a wiring module.

As shown in FIG. 5, the wiring module 20 includes a plurality of voltage detection terminals 21 (one example of the detection terminals that are constituent features of the present invention) connected to the ends of electric wires W for detecting the voltages of the electric cells 11 and a resin protector 28 made of a synthetic resin for accommodating the plurality of voltage detection terminals 21.

Voltage Detection Terminals

Figure 6:
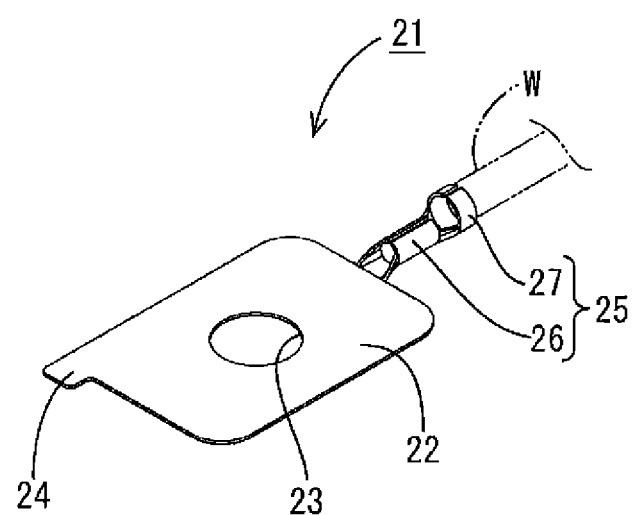
FIG. 6 is a perspective view showing a voltage detection terminal.

As shown in FIG. 6, each voltage detection terminal 21 is provided to detect the voltage of an electric cell 11 and includes a plate portion 22 and a wire connecting portion 25 for connection to one end of an electric wire W.

The plate portion 22 has a rectangular shape with a circular connecting member fixing hole 23 formed at its center. The connecting member fixing hole 23 is configured to be in alignment with the terminal fixing hole 19 formed in the detection connecting portion 18 of the connecting members 15. A fixing member (not shown) is passed through the connecting member fixing hole 23 and the terminal fixing hole 19 so as to electrically connect the voltage detection terminal 21 and the connecting member 15 and fix their positions relative to each other.

Formed at one corner of the top end of the plate member 22 is a rectangular engaging lug 24 jutting out forward.

The wire connecting portion 25 includes a wire barrel section 26 to which the conductor of the electric wire W is connected and an insulation barrel section 27 that secures the electric wire W via its sheath (the insulating layer).

The electric wire W is a cable whose conductor is exposed at its end by stripping off the insulating coating (insulating layer) and connected to the voltage detection terminal 21.

The wires W are gathered into a wire accommodation trough 43, to be described below, and guided to the battery ECU (not shown). The battery ECU includes an on-board microcomputer or other element with a known configuration to perform the functions to detect the voltages, currents, temperatures, etc., of the electric cells 11 and control the charging and discharging of the electric cells 11.

Resin Protector

Figure 7:
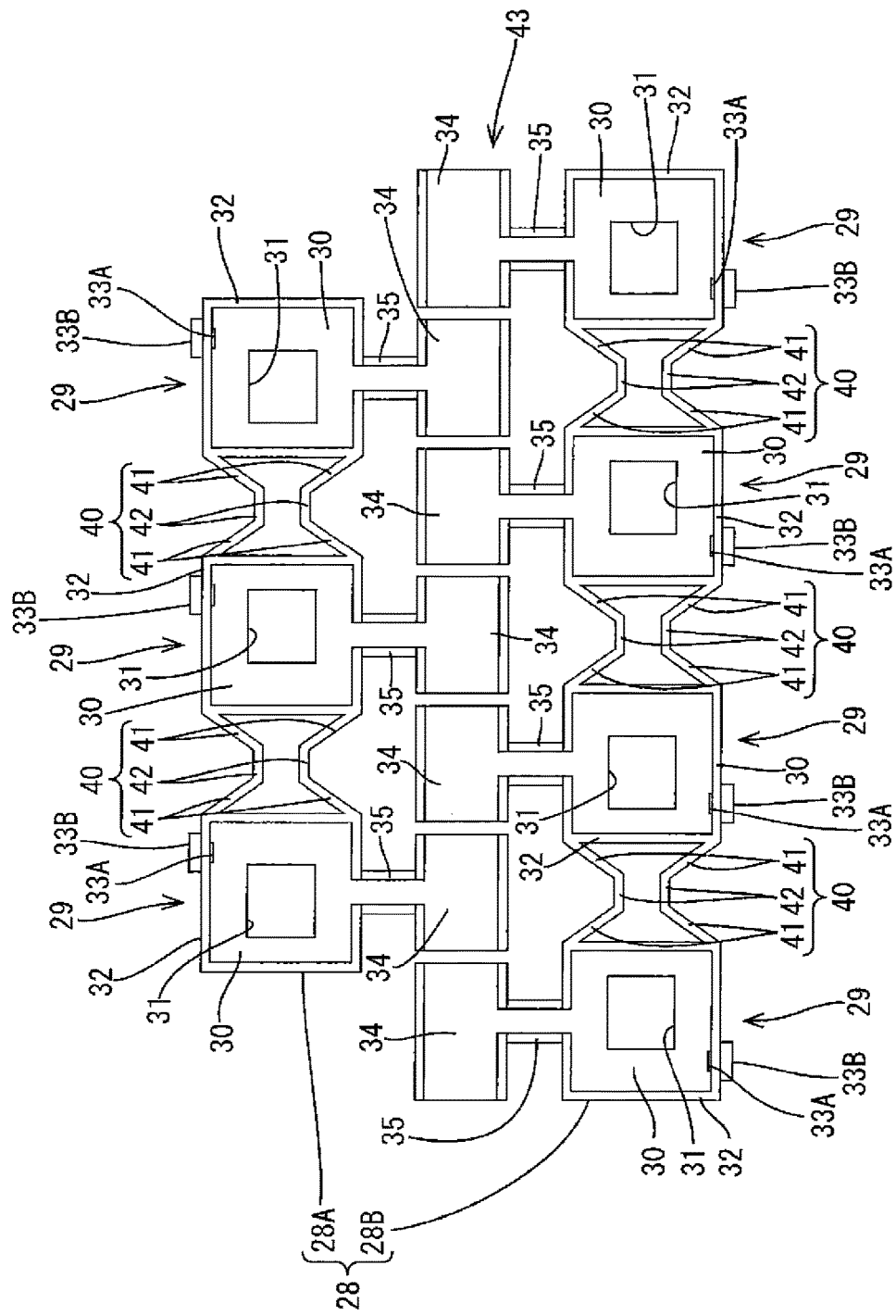
FIG. 7 is a plan view showing a resin protector.
Figure 8:
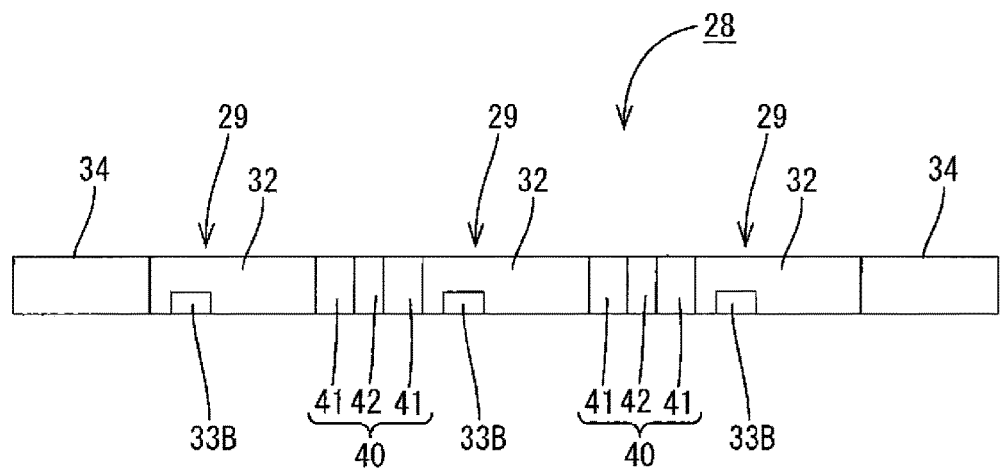
FIG. 8 is a rear view showing the resin protector.
Figure 9:
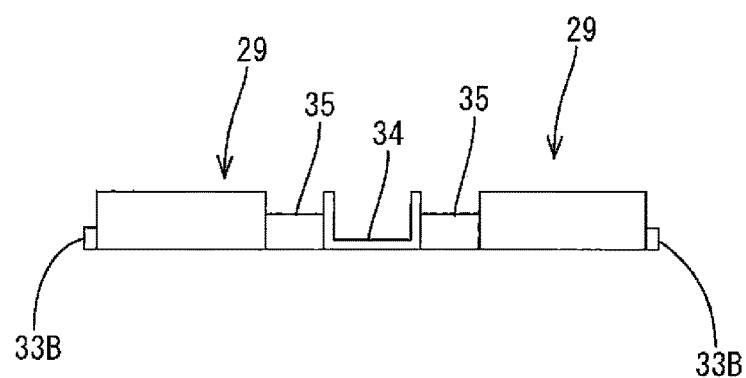
FIG. 9 is a side view showing the resin protector.

The resin protector 28 is made of a synthetic resin and, as shown in FIG. 7, includes a first protector 28A disposed on the forward side and a second protector 28B formed separately from the first protector 28A and disposed on the rear side, both of which have a plurality of retainer portions 29 for retaining the voltage detection terminals 21, trough portions 34 through which the electric wires W connected to the voltage detection terminals 21 are passed, and an interval adjusting device 40 connecting adjacent left and right retainer portions 29 and capable of adjusting the intervals between the adjacent retainer portions 29.

Each retainer portion 29 has a rectangular base plate 30 on which a voltage detection terminal 21 is set and partition walls 32 erected from the edges of the base plate 30.

A rectangular opening 31 is formed through the base plate 30, and the fixing member that connects the voltage detection terminals 21 and the connecting members 15 is adapted to penetrate the opening 31.

In order to prevent short-circuits caused by tools, etc., coming into contact with the voltage detection terminals 21, the partition walls 32 are erected to a sufficient height to prevent contact by tools, etc., and surround the voltage detection terminals 21.

The partitioning walls 32 retain the plate portion 22 in the retainer portion 29 by sandwiching the plate portion 22 from the front and the rear. Formed between the plate portion 22 and the left and right partition walls 32 are portions of the base plate 30 on which the plate portion 22 is not present. Note that, for example, a nail-shaped flexible projection that juts inward may be formed in the inner surface of a partition wall 32 by cutting out the partition wall 32 so that an edge of the plate member 22 may be fit under the nail of the flexible projection in order to prevent the voltage detection terminal 21 from being dislodged from the retainer portion 29.

Formed in the partition wall 32 distal to the trough portion 34 is an engaging lug insertion hole (not shown) into which the engaging lug 24 of the voltage detection terminal is inserted.

Figure 10:
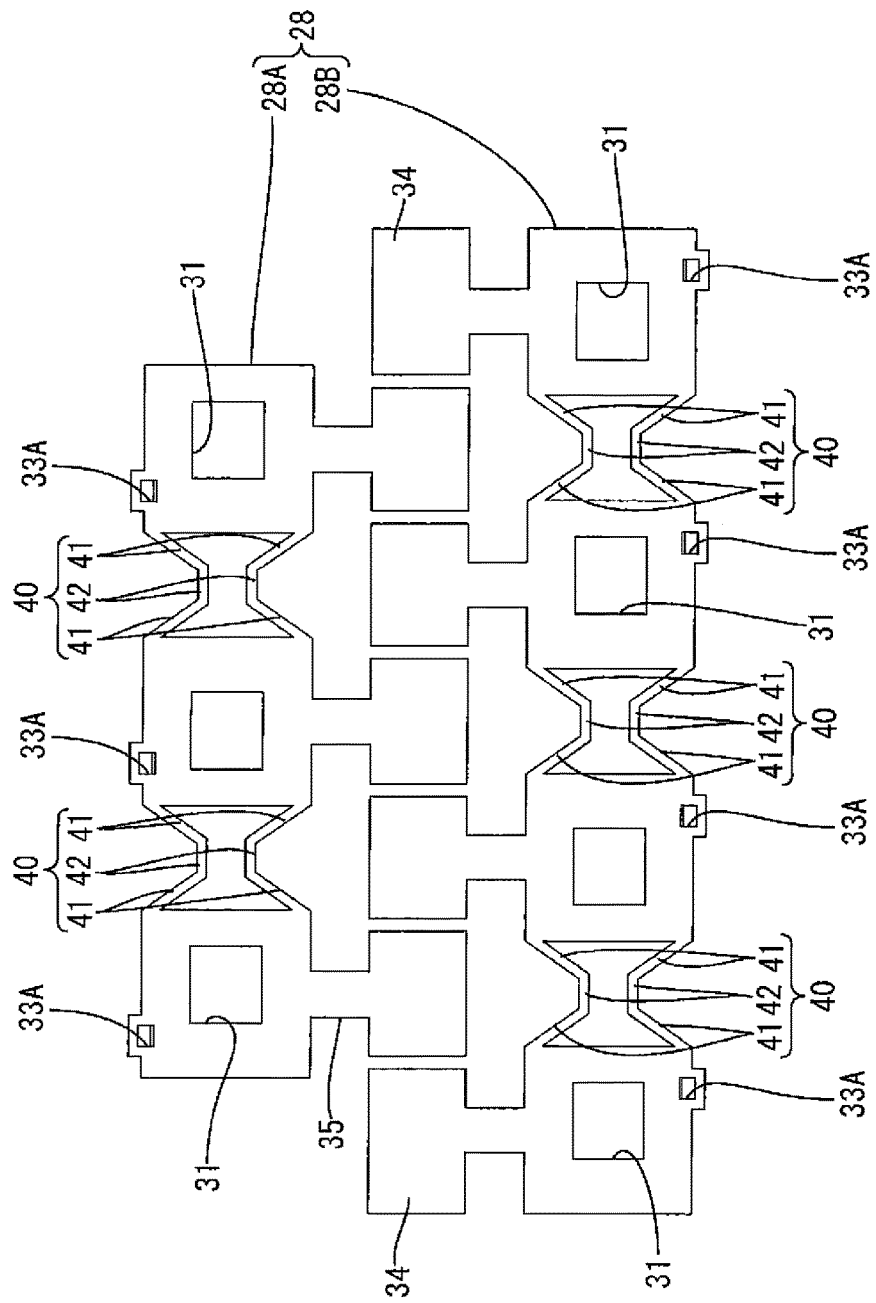
FIG. 10 is a bottom view showing the resin protector.

The engaging lug insertion hole is a laterally extending slit to allow the top portion of the engaging lug to slightly protrude from the engaging lug insertion hole. Note that, as shown in FIG. 10, a mold through-hole 33A for forming the engaging lug insertion hole is provided in the base plate 30 so as to be in line with the engaging lug insertion hole.

As shown in FIG. 7, an auxiliary wall 33B that covers the engaging lug insertion hole is provided on the outer surface of the partition wall 32 at the engaging lug insertion hole.

The trough portion 34 is connected via a passage groove 35 to the end of the retaining portion 29 that is distal to the connecting member 15.

The passage groove 35 is formed to accommodate the wire connecting portion 25 of the voltage detection terminal 21.

The trough portion 34 includes a trough bottom connected to the groove bottom of the passage groove 35 and trough walls erected from the front and rear edges of the trough bottom. The part of the trough walls that leads to the passage groove 35 is divided so that the electric wire W connected to the voltage detection terminal 21 can be guided into the trough portion 34 via the passage groove 35.

In each of the first protector 28A and the second protector 28B, the trough portions 34 associated with their respective retainer portions 29 are spaced apart in the direction in which the trough portions 34 extend. By fitting the trough portions 34 of each of the first protector 28A and the second protector 28B respectively into the gaps between the portions of the other protector, the trough portions 34 of the first protector 28A and the second protector 28B are aligned laterally to form the wire accommodation trough 43.

The interval adjusting device 40 connects the adjacent retainer portions 29 and accommodate dimensional tolerance during the assembly to the electric cell group 13 by adjusting the intervals between the adjacent retainer portions 29 with respect to the dimensional tolerance during the assembly. Each interval adjusting device 40 includes a pair of flexible portions 41 that extend obliquely from corners of the partition walls 32 relative to the lateral direction (the direction in which the retainer portions 29 are aligned) and a pair of connecting portions 42 that extends laterally to connect the left and right adjacent flexible portions 41.

The pair of flexible portions 41 is inclined toward each other (in directions that narrows the interval between the flexible portions) at a predetermined angle (approximately 55 degrees with respect to the lateral direction in this embodiment).

The pair of flexible portions 41 has a thick vertical (the direction in which the wiring module is assembled to the electric cell group) dimension that is approximately the same as the height of the partition walls 32. In addition, the thickness dimension of these portions (the thickness of the flexible portions shown in FIG. 7) is small, having approximately the same thickness as the partition walls 32.

Note that the angle of inclination with respect to the lateral direction, the vertical dimension, and the thickness of the flexible portions 41 are not limited to the foregoing values but may be set as required to other values suitable for accommodating the dimensional tolerance during the assembly to the electric cell group 13.

The connecting portions 42 are formed to be continuous with the flexible portions 41 and have the same height and thickness dimensions as the flexible portions 41.

The assembly of the wiring module 20 is described hereafter.

The resin protector 28 is formed by arranging the first protector 28A and the second protector 28B to align their respective trough portions 34 as the wire accommodation trough 43 (FIG. 7). In addition, the plurality of voltage detection terminals 21 connected to the terminals of the plurality of electric wires W are retained in the respective retainer portions 29, and the electric wires W are passed through the passage grooves 35 and the wire accommodation trough 43.

This forms the wiring module 20 (FIG. 5).

Figure 11:
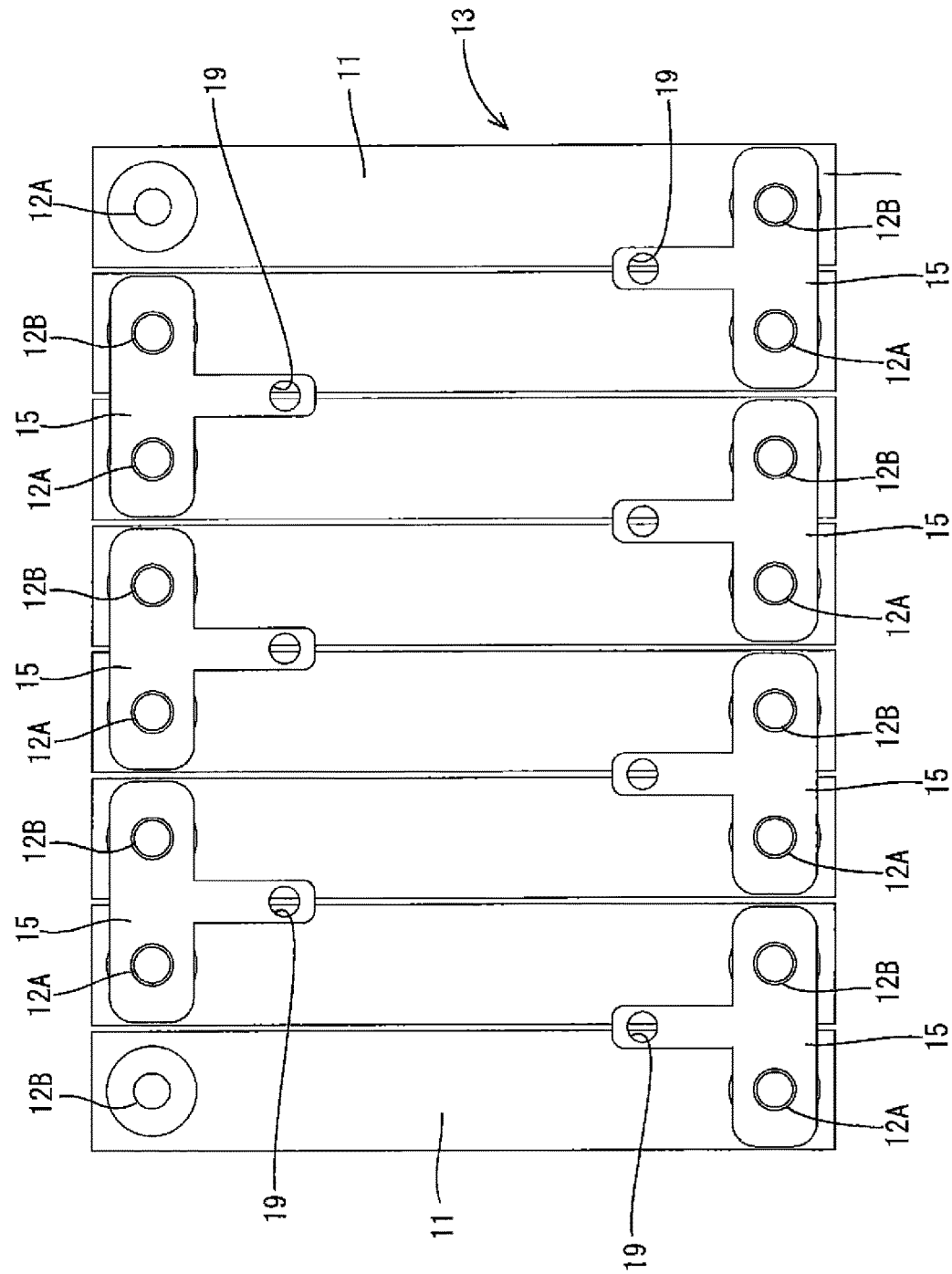
FIG. 11 is a plan view showing the connecting members assembled to the electric cell group.

Next, the through-holes 17 of the plurality of the connecting members 15 are fitted on adjacent electrode terminals 12A and 12B of the electric cell group 13 so as to assemble the connecting members 15 to the electric cell group 13 (FIG. 11).

The wiring module 20 is mounted on the electric cell group 13 to place the terminal fixing holes 19 of the connecting members 15 in communication with the connecting member fixing holes 23 of the voltage detection terminals 21 (FIG. 2). At this stage, if the connecting member fixing hole 23 of a voltage detection terminal 21 is displaced with respect to the terminal fixing hole 19 of the connecting member 15 due to the dimensional tolerance between the electrode terminals 12A and 12B, the dimensional tolerance between the electrode terminals 12A and 12B is accommodated by flexing (elastically deforming) the pair of flexible portions 41 of the interval adjusting device 40 of the wiring module 20 so as to align (communicate) the connecting member fixing hole 23 with the terminal fixing hole 19.

Then, the fixing members are passed through the connecting member fixing holes 23 and the terminal fixing holes 19, and the connecting members 15 are secured to the voltage detection terminals 21 with screws. Alternatively, the connecting members 15 may be secured to the voltage detection terminals 21 with fixing members prior to assembly to the electric cell group 13.

Next, the electrode terminals 12A and 12B are fastened with nuts to secure the connecting members 15 to the electric cell group 13. This completes the assembly of the battery module 10 with the wiring module 20 mounted on the electric cell group 13. At this stage, as the connecting members 15 are secured to the electric cell group 13, the positions of the voltage detection terminals 21 secured to the connecting members 15 are fixed (with respect to the electric cell group 13). Additionally, as the voltage detection terminals 21 are secured, the relative positions (with respect to the electric cell group 13) of the resin protectors 28 holding the voltage detection terminals 21 are also fixed.

The foregoing embodiment has the following effects:

(1) The battery module 10 includes an electric cell group 13 of a plurality of electric cells 11 with positive and negative electrode terminals 12A and 12B, connecting members 15 for connecting adjacent electrode terminals 12A and 12B, and a wiring module 20 assembled to the electric cell group 13. The wiring module 20 includes a plurality of voltage detection terminals 21 (detection terminals) connected to the ends of a plurality of electric wires W for detecting the conditions of the electric cells 11, a plurality of retainer portions 29 retaining the voltage detection terminals 21, and interval adjusting device 40 provided between the adjacent retainer portions 29 for adjusting the intervals between the retainer portions 29.

According to this embodiment, as the connecting members 15 are formed separately from the wiring module 20, the wiring module 20 can be made smaller.

As for the dimensional tolerance between adjacent electric cells 11, the interval adjusting device 40 provided between the adjacent retainer portions 29 can prevent discrepancies caused by the dimensional tolerance between the adjacent electric cells 11.

(2) The connecting members 15 include an electrode connecting portion 16 connecting adjacent electrode terminals 12A and 12B and a detection connecting portion 18 placed on and connected to a voltage detection terminal 21 (detection terminal).

In this way, even if the connecting members 15 are provided separately from the wiring module 20, it is possible to detect with the voltage detection terminals 21 the voltages (conditions) between the electrode terminals 12A and 12B with a simple structure.

(3) The interval adjusting device 40 are flexible portions 41 extending obliquely with respect to the direction in which the voltage detection terminals 21 (detection terminals) are aligned so as to be elastically deformable in the direction in which the voltage detection terminals 21 are aligned.

This simple structure can accommodate the dimensional tolerance between the electric cells 11.

(4) The flexible portions 41 are thick-walled in the direction in which the wiring module 20 is assembled to the electric cells group 13.

This may increase the rigidity of the wiring module 20 in the direction of its assembly.

(5) The electric cell group 13 has electrode terminals 12A and 12B arranged in two rows. The wiring module 20 includes a resin protector 28 that has a plurality of retainer portions 29 and a plurality of interval adjusting device 40. The resin protector 28 includes a first protector 28A and a second protector 28B assembled to the respective rows of electrode terminals 12A and 12B. The first protector 28A and the second protector 28B are both provided with trough portions 34 through which the wires connected to the voltage detection terminals 21 (detection terminals) are routed. The trough portions 34 of the first protector and the second protector are alternately aligned with one another to form a single wire accommodation trough 43.

This allows the electric wires W to be routed through the single wire accommodation trough 43, thereby simplifying the structure for routing of the electric wires W.

Other Embodiments

The present invention is not limited to the embodiments described in connection with the foregoing description and drawings. For example, the following embodiments also fall under the technical scope of the present invention.

(1) In the foregoing embodiment, the resin protector 28 has a plate shape but is not limited thereto; the structure of the present invention may also be applied to a resin protector formed by laterally connecting a plurality of separate (but identically shaped) link units. In this case, for example, each link unit for holding a detection terminal may be provided with an engaged portion and a portion for engaging the engaged portion of the adjacent link unit so as to connect the link units with the engaging and engaged portions and form interval adjusting device for adjusting the intervals between the link units.

(2) In the foregoing embodiment, a pair of flexible portions 41 is provided as the interval adjusting device 40. The interval adjusting device, however, is not limited thereto. For example, elastic members capable of elastic deformation in the lateral directions may be used to adjust the intervals between the adjacent retainer portions 29. As an additional example, it is also possible to use only one of the pair of flexible portions 41 to constitute the interval adjusting device.

(3) The number of electric cells 11 for constituting the battery module 10 is not limited to that according to the foregoing embodiment. Furthermore, the number of the retainer portions 29 or the interval adjusting device 40 may be changed according to the number of electric cells 11 as appropriate.

(4) In the foregoing embodiment, the connecting members 15 are fitted on the electrode terminals 12A and 12B and fastened thereto with nuts, but there is no limitation to this. Alternatively, the electric cells 11 may be provided with nut-shaped electrode terminals so that bolts can be tightened on the nut-shaped electrode terminals.

(5) In the foregoing embodiment, the voltage detection terminals 21 for detecting the voltages of the electric cells 11 are retained in the retainer portions 29, but there is no limitation to this. Alternatively, detection terminals for detecting conditions (for example, currents, temperatures, etc) of the electric cells 11, rather than the voltage detection terminals 21 for detecting the voltages, may be retained in the retainer portions 29.

(6) The connecting members 15 may be contained in containment members with partition walls that are separately provided from the wiring module 20 (the resin protector 28) so as to insulate the connecting members 15 from the outside.

(7) In the foregoing embodiment, the connecting members 15 connect oppositely polarized electrode terminals 12A and 12B (serial connection), but there is no limitation to this. Alternatively, the connecting members 15 may connect electrode terminals 12A (12B) with the same polarity (parallel connection). For example, additional electric cells 11 may be connected in parallel to the battery module 10, and electrode terminals 12A (12B) with the same polarity in the parallel connection may be connected with a plurality of connecting members 15.

(8) In the foregoing embodiment, the voltage detection terminals 21 are connected to the connecting members 15 but are not limited thereto. For example, voltage detection electrodes separate from the electrode terminals connected to the connecting members may be provided in the electric cells and the voltage detection terminals 21 of the wiring module may be connected to the voltage detection electrodes in the electric cells, rather than to the connecting members 15, so as to detect the voltages (conditions) of the electric cells.

REFERENCE SINGS LIST

10 . . . Battery module
12A, 12B . . . Electrode terminal
11 . . . Electrode cells
13 . . . Electric cell group
15 . . . Connecting member
16 . . . Electrode connecting portion
18 . . . Detection connecting portion
19 . . . Terminal fixing hole
20 . . . Wiring module
21 . . . Voltage detection terminal (detection terminal)
22 . . . Plate portion
23 . . . Connecting member fixing hole
28 . . . Resin protector
28A . . . First protector
28B . . . Second protector
29 . . . Retainer portion
30 . . . Base plate
32 . . . Partition wall
34 . . . Trough
40 . . . Interval adjusting device
41 . . . Flexible portion
42 . . . Connecting portion
43 . . . Wire accommodation trough
W . . . Wire

The invention claimed is:

1. A battery module comprising:
an electric cell group of a plurality of electric cells with positive and negative electrode terminals;
connecting members that connect adjacent ones of the positive and negative electrode terminals; and
a wiring module assembled to the electric cell group;
wherein the wiring module comprises:
a plurality of detection terminals connected to ends of a plurality of electric wires detecting conditions of electric cells,
a plurality of retainer portions retaining the plurality of detection terminals, and
an interval adjusting device provided between adjacent ones of the plurality of retainer portions configured to adjust the intervals between the plurality of retainer portions, the retainer portions including partition walls having corners, and the interval adjusting device extending obliquely from the corners of the partition walls with respect to the direction in which the plurality of retainer portions are aligned.

2. The battery module according to claim 1, wherein the connecting members include an electrode connecting portion that connects the adjacent ones of the positive and negative electrode terminals and a detection connecting portion placed on and connected to one of the plurality of detection terminals.

3. The battery module according to claim 1, wherein the interval adjusting device includes flexible portions extending obliquely with respect to the direction in which the plurality of retainer portions are aligned so as to be elastically deformable in the direction in which the plurality of retainer portions are aligned.

4. The battery module according to claim 3, wherein the flexible portions are thick-walled in the direction in which the wiring module is assembled to the electric cells group.

5. The battery module according to claim 1, wherein the electric cell group has the positive and negative electrode terminals arranged in two rows and the wiring module includes a resin protector having the plurality of retainer portions and the interval adjusting device, wherein the resin protector includes a first protector and a second protector assembled to the respective rows of the positive and negative electrode terminals, wherein the first protector and the second protector are both provided with troughs through which the electric wires connected to the plurality of detection terminals are routed, and wherein the troughs of the first protector and the second protector are alternately aligned with one another to form a single wire accommodation trough.

6. A wiring module assembled to an electric cell group of a plurality of electric cells with positive and negative electrode terminals, adjacent ones of the positive and negative electrode terminals being connected to one another with connecting members, the wiring module comprising:
 a plurality of detection terminals connected to ends of a plurality of electric wires detecting conditions of electric cells;
 a plurality of retainer portions retaining the plurality of detection terminals; and
 an interval adjusting device provided between adjacent ones of the plurality of retainer portions configured to adjust the intervals between the plurality of retainer portions, the plurality of retainer portions including partition walls having corners, and the interval adjusting device extending obliquely from the corners of the partition walls with respect to the direction in which the plurality of retainer portions are aligned.

7. The wiring module according to claim 6, wherein the connecting members include an electrode connecting portion that connects the adjacent ones of the positive and negative electrode terminals and a detection connecting portion placed on and connected to one of the plurality of detection terminals.

8. The wiring module according to claim 6, wherein the interval adjusting device includes flexible portions extending obliquely with respect to the direction in which the plurality of retainer portions are aligned so as to be elastically deformable in the direction in which the plurality of retainer portions are aligned.

9. The wiring module according to claim 8, wherein the flexible portions are thick-walled in the direction in which the wiring module is assembled to the electric cells group.

10. The wiring module according to claim 6, wherein the electric cell group has the positive and negative electrode terminals arranged in two rows and the wiring module includes a resin protector having the plurality of retainer portions and the interval adjusting device,
 wherein the resin protector includes a first protector and a second protector assembled to the respective rows of the positive and negative electrode terminals,
 wherein the first protector and the second protector are both provided with troughs through which the electric wires connected to the plurality of detection terminals are routed, and
 wherein the troughs of the first protector and the second protector are alternately aligned with one another to form a single wire accommodation trough.

* * * * *